Inventors:
Robert E. Martner
Carmen S. Phillips

United States Patent Office 3,528,233
Patented Sept. 15, 1970

3,528,233
VARIABLE SPACING ROW CROP HARVESTER
Robert E. Martner, Plano, and Carmen S. Phillips, Downers Grove, Ill., assignors to International Harvester Company, Chicago, Ill., a corporation of Delaware
Filed May 28, 1968, Ser. No. 732,740
Int. Cl. A01d 45/02
U.S. Cl. 56—119                    7 Claims

ABSTRACT OF THE DISCLOSURE

Multiple row harvester having a frame defining fixed passages for the respective crop rows, each passage being of substantial width to accommodate wide variation of spacing of the rows, and having a guide selectively positionable therein according to predetermined spacing of the rows; the guides being removaple and re-positionable on corresponding sides of the different passages for different spacings of rows.

CROSS REFERENCES

Figure 1:
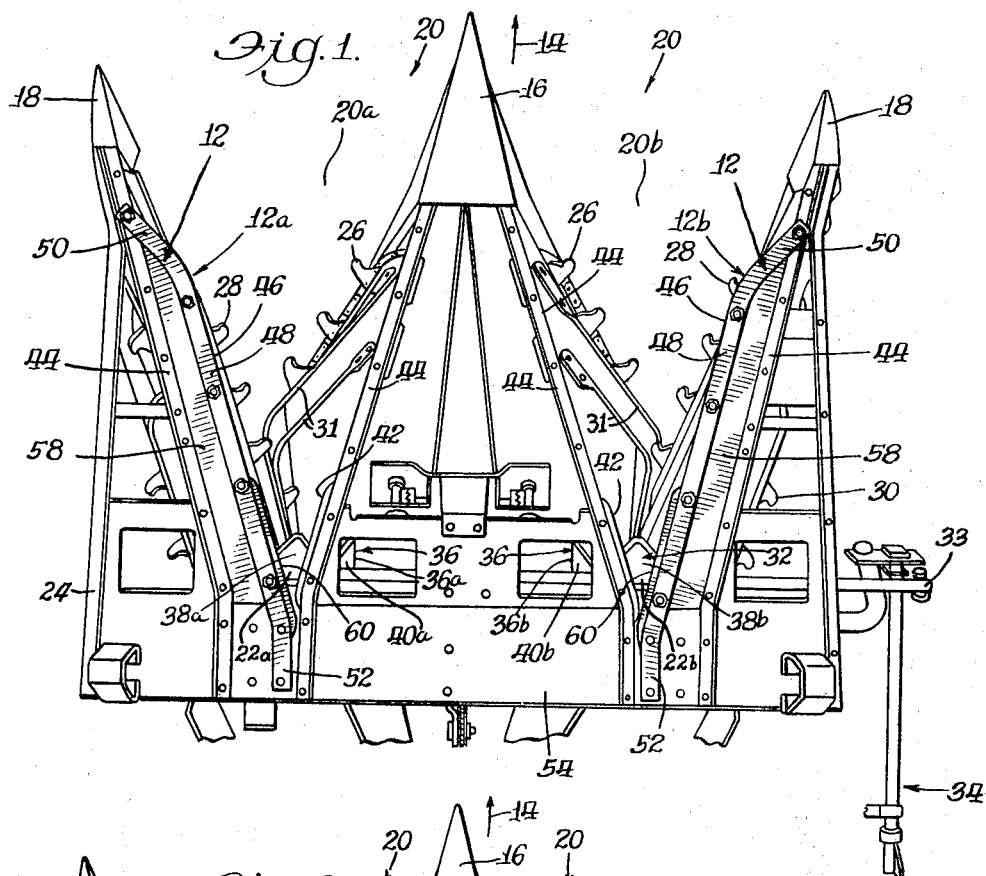

Co-pending application of John J. Kowalik and Ronald F. Zitko, Ser. No. 732,742, filed May 28, 1968 for Variable Spacing Row Crop Harvester (IHC D-8946), assigned to the assignee of the present invention.

Co-pending application of James H. Bornzin, Ser. No. 732,741 filed May 28, 1968, now Pat. No. 3,496,708, for Variable Spacing Row Crop Harvester (IHC D-8936), assigned to the assignee of the present invention.

PRIOR ART

U.S. Patent No. 3,365,867, Phillips, issued Jan. 30, 1968.

BACKGROUND

The invention is applied to a row crop harvester of a generally known kind, constructed for accommodating row plants. The spacing of the rows of various plants is not uniform, and they may vary throughout quite a wide range. For example, corn rows may be as closely spaced as 28 inches and as widely spaced as 42 inches and it is desired that a harvester be constructed for accommodating rows spaced within this range.

As a general rule the plant rows of any one farmer or user are of the same spacing i.e., the rows would not be spaced differently from one field to the next. A harvester for him then if it is provided with means for harvesting a field of a predetermined row spacing would generally be satisfactory, but the farmers from one to the next may have differently spaced rows. In that case it would be relatively expensive for the manufacturer to provide harvesters constructed completely differently throughout to accommodate the different spacings, but in the present case a single harvester can be provided which will accommodate the maximum variation in spacing of rows, this harvester then constituting a basic or principal machine. Then with the addition of a simple and inexpensive construction, the harvester which is constructed throughout the full range of spacing can be adapted to an individual's particular spacing, with consequent economy in production of the equipment.

As pointed out in the prior art patent referred to above, the throats of the passages each may be 7 inches wide, the width of the two together totaling the variation in spacing referred to above, namely, fourteen inches, half of which is accommodated in each of the two passages. While the harvester as disclosed in that patent is effective for the purpose intended, there are times when the crop plants may be bunched too much at one side or the other of the passages, resulting in lesser efficiency in the cutting operation.

OBJECTS OF THE INVENTION

A broad object of the invention is to provide, in a multiple row crop harvester of a basic design for accommodating different row spacings, novel guide means mountable on such harvester for specifically adapting it to a particular spacing within that range.

Another object is to provide simple guide means in a multiple row crop harvester that is easily positionable in different positions or attitudes in the different passages of such harvester, to accommodate rows of different spacings.

Another and more specific object is to provide guide means of the general character referred to, which is of simple design and structure and adapted to positioning each on a respective side of a passage, whereby in order to position the guide means according to narrow or wide spacing, the respective guide means can be re-positioned on the corresponding side of each of the different passages whereby, because of the corresponding mounting of the guide means in each of the different passages, a simplified structure results.

DESCRIPTION OF A PREFERRED EMBODIMENT

Figure 2:
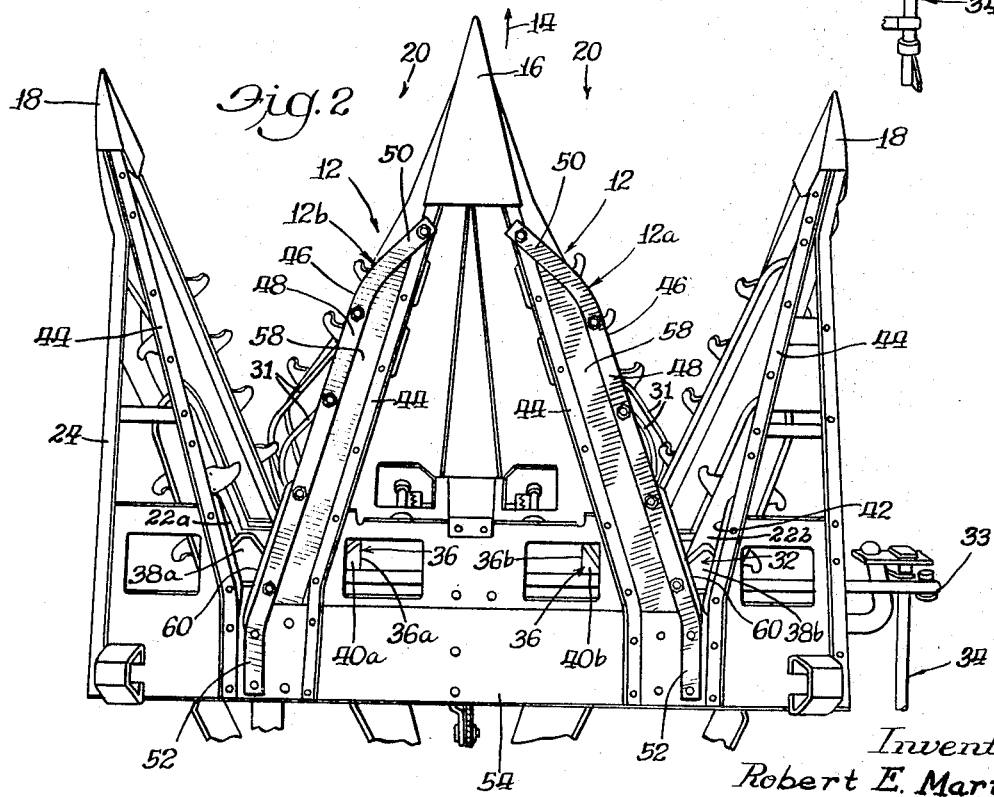

In the drawings:
FIG. 1 shows an under view of the principal portion of a row crop harvester with the device of the present invention applied thereto; and
FIG. 2 is a view similar to FIG. 1 but showing the members of the device in alternative positions relative to FIG. 1.

A harvester in its entirety is indicated at 10, to which the invention is applied, this harvester being of the same construction disclosed in the prior patent mentioned, but with changes to be referred to hereinbelow. The invention includes a pair of guides or members 12, individually identified as 12a and 12b for convenience. The harvester is adapted to move along the plant rows, in the direction indicated by the arrow 14, and includes a center gathering point 16 and side gathering dividers 18 defining passages 20, individually identified 20a and 20b.

The passages diverge rearwardly and terminate in throats 22 similarly individually identified 22a and 22b. The harvester includes a rigid frame structure 24 of suitable construction and made up of suitable elements such as angle irons, etc., defining the passages 20. Mounted in the frame are gathering chains in each passage, these including an inner chain 26, an outer chain 28 and a butt chain 30 below the outer chain 28. Mounted in each passage also are pressure straps 31 secured at their front ends to the center gathering point 16 and having their rear ends loose and detached and extending rearwardly in the passage into or beyond the throat 22. These pressure straps cooperate with the gathering chain 28 and the butt chain 30 in confining the plant stalks against those two chains and aiding the confinement of the stalks in gathering them rearwardly in the passage.

Incorporated in the harvester is a cutting means indicated generically at 32 which takes the form of a rectilinearly reciprocating sickle. This sickle includes a bar 33 driven by suitable means 34 which in turn is driven by any suitable source, such as the impelling tractor. The sickle includes two segments 36 individually identified 36a and 36b each segment including in this instance two full sections 38a and 38b, and a half section 40a and 40b respectively. These sections are mounted on the bar 33 and upon reciprocation of the sickle, in the usual manner, the plant stalks are cut as they pass through the throat. The sickles work against edge knives 42 mounted on suitable elements 44 of the frame in suitable locations spanning, in fore-and-aft direction, the complete range of cutting effectiveness of the sickle. At this point it is appropriate to point out a distinction of the structure of the harvester as a whole from that disclosed in the prior art patent referred to above, this difference being that the ledger dividers (54) of that patent are omitted from the present construction.

The guides 12a and 12b are similar, but symmetrically opposite in construction so that each is constructed for a particular side of a passage of the harvester. Since they are similar in construction, a detail description of one will suffice, and referring specifically to the guide means 12a it includes a guide or guide member 46 having an intermediate and main segment or portion 48, a fore segment or portion 50 of relatively short length, and a rear segment or portion 52 also of relatively short length. The fore segment 50 is secured to the frame as to the fixed frame element 44 while the rear segment 52 is secured to another fixed frame element 54 at the rear.

The securement may be by any suitable means, such as by bolts to facilitate re-locating them as referred to hereinbelow. An element 58 is interposed in the construction of the guide means and is so shaped and proportioned as to form a spacer and filler, solidifying the guide 46 with the frame element 44, the element 58 being substantially co-extensive with the main segment 48 of the guide.

The guide 46 is so shaped and proportioned that when in position as described above, the main segment 48 extends generally in the direction of the corresponding frame element 44 and constitutes the effective side surface of the passage, shifting the rear portion of the passage effectively inwardly toward the opposed frame element 44. The rear extremity of the main segment 48 extends into the throat 22 and rearwardly beyond the cutting effectiveness of the sickle.

Secured to the guide 46 is a knife 60 which may be of indeterminate length, its forward end being for example at about the central portion of the main segment 48 while at the rear it extends beyond the rearmost cutting effectiveness of the sickle. This knife is opposed to the edge knife 42.

The two guide means 12a and 12b are, as indicated above, of opposite arrangement, being symmertically so and in FIG. 1 they are mounted on the outer or outboard sides of the passages, but the invention contemplates the alternative mounting of these guide means on the inner or inboard sides of the passages. FIG. 2 shows the latter arrangement and it is believed unnecessary to describe the detail mounting of the guide means, but it is desired to point out that because of the opposite construction of the two guide means, they are positioned respectively in the different passages when mounted on the opposite sides of the passages, i.e., in the one case, FIG. 1, the guide means 12a is in the passage 20a while in FIG. 2 it is in the passage 20b; on the other hand the guide means 12b in FIG. 1 is in the passage 20b while in FIG. 2 it is arranged in the passage 20a.

The opposed frame elements 44 in each passage preferably are symmetrically arranged i.e., at the same angle to the longitudinal center line of the respective passage and when each guide means is mounted in either of the passages, it forms a similar or at least corresponding angle to that center line.

The guide means 12 are arranged in FIG. 1 for narrow spacing of plant rows, the rows being spaced apart a distance similar to the inner sides of the passages, and the guide means guide and confine those plants correspondingly adjacent the inner sides of the passages, preventing the random shifting or bunching of the plants throughout the width of the passages and particularly the throats thereof.

FIG. 2 shows the positioning of the guide means for accommodating wide spacing of the rows. The rows would be adjacent the outer sides of the passages, and the guide means guide and confine the plants toward those sides of the passages, preventing again in this case shifting or bunching of the plants throughout the width of the throats of the passages. The knives 60 in either case cooperate with the edge knives 42 which are arranged opposite them in the particular location, and each coacts with the sickle in cutting the plant stalks. The knives 60, 42 preferably are positioned on the side of their mounting elements adjacent the sickle to more effectively produce a shearing action.

What is claimed is:

1. A row crop harvester having a plurality of passages for receiving the plants of a corresponding number of rows, the passages each being of substantial width for receiving the plants notwithstanding variation in spacing between the rows, each passage having an inboard and an outboard side, means in each passage for cutting the plants in that passage, guide means in each passage operable for guiding and confining the plants to corresponding lateral positions of the passages, the guide means being formed and arranged for interchange from one passage to another passage and being alternately positionable between the inboard side of said one passage and the outboard side of said other passage and between the outboard side of said one passage and the inboard side of said another passage, and knife means on each guide means positioned for shearing cooperation with the cutting means.

2. A harvester according to claim 1, wherein each guide means includes a rigid guide having a main section relatively long and straight, and relatively short sections at the ends for mounting them in position with the main sections disposed in the passages.

3. A harvest according to claim 2, wherein the guide means includes said knife means at least at the rear portion thereof.

4. A harvester according to claim 1, and including a framework having edge knives on opposite sides of each of the passages, and the guide means includes said knife means opposed to corresponding edge knives.

5. A harvester according to claim 4, wherein the knife means on the guide means and the edge knives on the framework extend rearwardly beyond the cutting range of the cutting means.

6. A harvester according to claim 2, and including a framework having fixed elements defining the passages, the passages defining elements being substantially symmetrical about fore-and-aft median lines, the guide means being so shaped that in position in the passages the long section is substantially parallel with its adjacent framework element and forms with the opposed framework element a path shaped similary to the respective passage but extending rearwardly beyond the passage to form a narrow throat, and the knife means on the guide means and an edge knife on the opposed framework element cooperating with the cutting means in cutting the plants, and said path extending rearwardly beyond cutting range of the cutting means.

7. A harvester according to claim 1, and including a framework having fixed elements defining said passages, and knife means on said fixed elements in opposed relation in either position of the guide means.

References Cited

UNITED STATES PATENTS

| | | | |
|---|---|---|---|
| Re. 24,565 | 11/1958 | Wigham | 56—98 |
| 1,491,069 | 4/1924 | Scranton | 56—102 |
| 2,783,603 | 3/1957 | Smith et al. | 56—98 XR |
| 2,970,420 | 2/1961 | Schmidt | 56—98 |
| 2,984,962 | 5/1961 | Heising | 56—102 |
| 3,213,597 | 10/1965 | Procter | 56—102 XR |
| 3,365,867 | 1/1968 | Phillips | 56—53 |

LOUIS G. MANCENE, Primary Examiner

J. A. OLIFF, Assistant Examiner